US005517557A

United States Patent [19]
Tanaka

[11] Patent Number: 5,517,557
[45] Date of Patent: May 14, 1996

[54] FACSIMILE APPARATUS WITH AUTOMATIC TELEPHONE ANSWERING FUNCTION

[75] Inventor: Sejii Tanaka, Fukuoka, Japan

[73] Assignee: Matsushita Electric Industrial Co., Ltd., Osaka, Japan

[21] Appl. No.: 241,896

[22] Filed: May 13, 1994

Related U.S. Application Data

[63] Continuation-in-part of Ser. No. 777,333, Nov. 29, 1991, abandoned.

[30] Foreign Application Priority Data

Apr. 4, 1990 [JP] Japan ........................... 2-89928
Apr. 1, 1991 [WO] WIPO ................... PCT/JP91/00431

[51] Int. Cl.$^6$ .................................................. H04M 1/64
[52] U.S. Cl. ........................... 379/67; 379/100; 379/142
[58] Field of Search ................................. 379/67, 88, 89, 379/142, 100

[56] References Cited

U.S. PATENT DOCUMENTS

| | | | |
|---|---|---|---|
| 4,126,762 | 11/1978 | Martin et al. | 379/106 |
| 4,551,581 | 11/1985 | Doughty. | |
| 4,582,956 | 4/1986 | Doughty. | |
| 4,942,598 | 7/1990 | Davis. | |
| 5,014,296 | 5/1991 | Saigano. | |
| 5,056,132 | 10/1991 | Coleman et al. | |
| 5,117,452 | 5/1992 | Callele et al. | |
| 5,138,652 | 8/1992 | Hashimoto | 379/79 |
| 5,200,994 | 4/1993 | Sasano et al. | 379/88 |
| 5,388,150 | 2/1995 | Schneyer et al. | 379/88 |

FOREIGN PATENT DOCUMENTS

| | | |
|---|---|---|
| 89305941 | 12/1989 | European Pat. Off. |
| 63-191456 | 8/1988 | Japan. |
| 63-260264 | 10/1988 | Japan. |
| 1-300664 | 12/1989 | Japan. |

*Primary Examiner*—Jeffery Hofsass
*Assistant Examiner*—Fan Tsang
*Attorney, Agent, or Firm*—Lowe, Price, LeBlanc & Becker

[57] ABSTRACT

A facsimile apparatus with automatic telephone answering function, comprises: a ring signal detection circuit; a detection circuit for detecting telephone number data sent with the ring signal through the telephone line; an interface circuit for connecting the same with the telephone line; a telephone portion for communicating with the telephone line; a facsimile portion for communicating with the telephone line; a storing circuit for storing a predetermined telephone number data; a comparing circuit for comparing telephone number data detected by the detection circuit with the predetermined telephone number data and for indicating as a result of the comparison whether the telephone portion or the data communication circuit is to be operated; and a control circuit responsive to the comparing circuit for operating the telephone portion when the result of the comparing circuit indicates the telephone portion and for operating the data communication circuit when the result indicates the data communication circuit. The telephone portion may comprise OGM sending and ICM recording circuits. The OGM may be sent after a predetermined times of generation of ring sound.

8 Claims, 4 Drawing Sheets

FACSIMILE APPARATUS WITH AUTOMATIC TELEPHONE ANSWERING FUNCTION

This application is a continuation-in-part of application Ser. No. 07/777,333 filed Nov. 29, 1991 (now abandoned).

BACKGROUND OF THE INVENTION

1. Field of the Invention

This invention relates to a facsimile apparatus with automatic telephone answering function.

2. Description of the Prior Art

Recently, function of the telephone has been improved, and the facsimile has been popularized. Moreover, a facsimile apparatus with automatic telephone answering function has been provided, wherein both functions have been integrated.

Formerly, a facsimile apparatus with automatic telephone answering function such as a facsimile with an answering telephone, when in the automatic answering mode, makes a connection with the telephone line automatically, determined whether the communication partner is a facsimile or not by observing an input signal from the partner's line, and selects state wherein either the facsimile is operated or the answering telephone is operated.

Hereinbelow will be described the above-mentioned prior art facsimile apparatus with automatic telephone answering function with reference to drawings.

Figure 3:
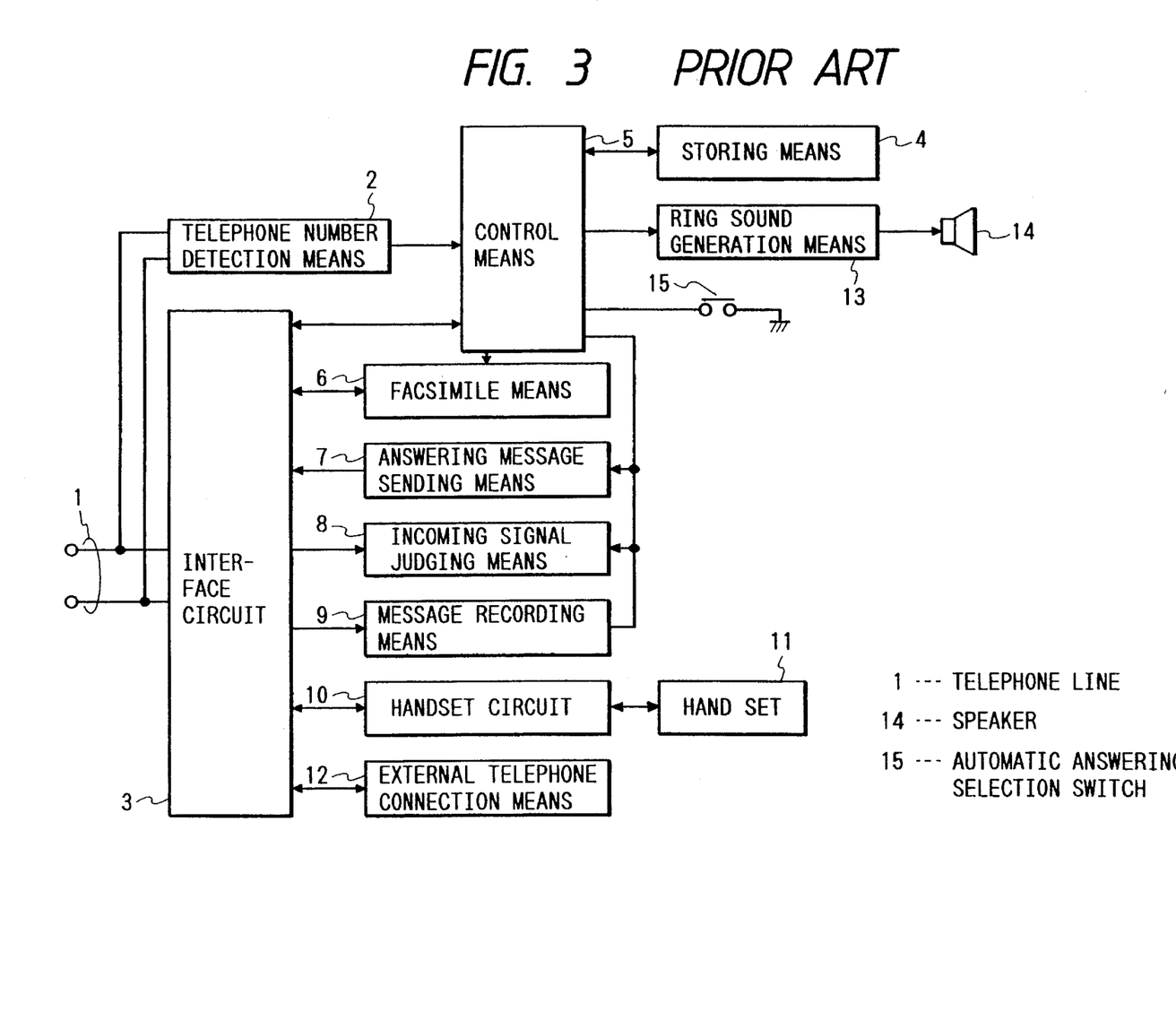
FIG. 3 shows a block diagram of a prior art facsimile apparatus with automatic telephone answering function.

FIG. 3 shows a block diagram of a prior art facsimile apparatus with automatic telephone answering function. In FIG. 3, numeral 1 is a telephone line, numeral 2 is a ring signal detection means, numeral 3 is an interface circuit, numeral 4 is a storing means for storing various operations, numeral 5 is a control means, numeral 6 is a facsimile communication means as data communication means, numeral 7 is an answering message sending means (hereinafter referred to as OGM), numeral 8 is an incoming signal judging means, numeral 9 is a message recording means (hereinafter referred to as ICM) as signal recording means incoming from the telephone line, numeral 10 is a handset circuit, numeral 11 is a hand set, numeral 12 is external telephone connecting means, numeral 13 is a ring sound generation means, numeral 14 is a speaker, and numeral 15 is an automatic answering selection switch.

Hereinbelow will be described an operation of the prior art facsimile apparatus with automatic telephone answering function comprising the above-mentioned structural elements.

At first, the ring signal detection means 2 of the facsimile apparatus with automatic telephone answering function detects a ring signal from a not-shown central exchange office (C.O.) and its output is sent to the control means 5. The control means 5 generates a ring sound signal by the ring sound generation means 13 and the ring sound is outputted from the speaker 14.

In the case that the automatic answering selection switch 15 is in ON-state, the control means 5 causes the interface circuit 3 to make a connection with the telephone line 1 in response to the ring signal. After completion of making connection of the telephone line 1, the control means 5 causes the OGM sending means 7 to send an OGM and causes the incoming signal judging means 8 to observe the signal incoming from the telephone line 1 through the interface circuit 3. When the caller sends a facsimile demand signal for demanding facsimile communication (for example, DTMF signal), the incoming signal judging means 8 detects this signal and sends an output signal to the control means 5. The control signal 5 causes the OGM sending means 7 to stop sending of the OGM and to operate the facsimile communication means 6 to start facsimile communication.

In the case that the facsimile communication demand signal from a caller is not inputted during sending of the OGM, when sending of the OGM ends, the control means 5 operates a timer means included therein as well as operates the ICM recording means 9.

During this operation if the incoming judging means 8 detects a voice signal, the control means 5 resets operation of the internal timer and operates the message recording means 9 to record an incoming message.

When the incoming judging means 8 detects the silence for a given interval detected by counting of the timer or when the facsimile communication start signal is detected, the control means 5 does not cause recording operation by the ICM recording means but causes the facsimile communication means 6 to start facsimile communication.

However, according to the above-mentioned structure, there is a problem that a considerable interval is necessary to start the facsimile communication because switching to the facsimile communication is made after judging whether the partner telephone is a facsimile or not in accordance with the signal inputted after the making of connection with the telephone line.

Moreover, particularly, in the case of a facsimile communication, there is a specification that communication shall start within a predetermined interval after the caller sends its telephone number. As the result, there is also a problem that facsimile communication cannot be executed when an excessive interval has passed up to judgement.

Another prior art method and apparatus for sending a data message to a selected station during a silent interval between ringing are disclosed in U.S. Pat. No. 4,551,581 of which date of patent is Nov. 5, 1985. According to abstract of this patent, the apparatus includes a detector and a sender. Responsive to a first ringing signal, the detector generates a status signal representative of the silent interval between ringing signals. During the silent interval, the sender sends to the selected station a frequency shift keyed signal representative of the data message. Moreover, the message includes special service information such as the directory number of the calling station at column 3, lines 36 to 37.

Further prior art method and apparatus for displaying special service information data selected station during a silent interval between ringing are disclosed in U.S. Pat. No. 4,582,956 of which date of patent is Apr. 15, 1986. According to abstract of this patent, a frequency shift keyed (FSK) signal which represents the special service information is filtered from the ringing signals by the line interface unit of the apparatus. A converter thereof detects the FSK signal and demodulates the special service information from the FSK signal. Upon detection of the FSK signal, a control circuit receives and stores the special service information. The stored special service information is then periodically sent to the display unit to begin exhibiting the information during the silent interval before the next ringing signal.

SUMMARY OF THE INVENTION

The present invention has been developed in order to remove the above-described drawbacks inherent to the conventional facsimile apparatus with automatic telephone answering function.

According to the present invention there is provided a first facsimile apparatus with automatic telephone answering function capable of shortening the response interval by selectively operating either of the data communication apparatus or the answering telephone using caller's-telephone-number-indicating function. Devices for automatically generating and transmitting a caller's telephone number within an interval in a ring signal are known as are devices fro receiving and automatically identifying the caller's number. Such caller telephone number detection devices are known in the art as ANI (automatic number identification) devices. The present invention thus selectively operates a particular device in accordance with the telephone number of the caller inputted at the same instance as the ring signal.

According to the present invention there is also provided a second facsimile apparatus with automatic telephone answering function, comprising: a ring signal detection means for detecting a ring signal from a telephone line; a telephone number detection means responsive to the ring signal detection means for detecting caller identifying telephone number data sent with the ring signal through the telephone line; an interface means for making a connection with the telephone line in response to detection of a ring signal and after the caller identifying telephone number data is sent; a telephone portion for communicating with the telephone line through the interface means; a data communication means for communicating with the telephone line through the interface means; a storing means for storing a predetermined telephone number data; a comparing means for comparing caller identifying telephone number data detected by the telephone number detection means with the predetermined telephone number data and for indicating as a result of the comparison whether the telephone portion or the data communication means is to be operated; and a control means responsive to the comparing means for causing the telephone portion to operate when the result of the comparing means indicates the telephone portion and for causing the data communication means to operate when the result indicates the data communication means.

According to the present invention there is further provided a third facsimile apparatus as mentioned in the second facsimile apparatus, wherein the telephone portion comprises: a message sending means responsive to the control means for sending a first message to the telephone line through the interface means when the telephone portion is operated by the control means; and a message recording means responsive to the message sending means for recording a second message sent from the telephone line through the interface means.

According to the present invention there is further provided a fourth facsimile apparatus as mentioned in the second facsimile apparatus, wherein the data communication means comprises a facsimile means responsive to the control means for receiving a data signal from the telephone line through the interface means and forming an image from the data signal when the data communication means is operated by the control means.

According to the present invention there is also provided a fifth facsimile apparatus as mentioned in the second facsimile apparatus, wherein the control means responds directly to the comparing means for operating the telephone portion or the data communication means, thereby shortening a response time for data communication by operating free of a requirement for transmission of a data identifying signal and discrimination between data and voice communication.

The automatic answering means may be actuated after a predetermined time interval has passed or predetermined number of detection of the ring signals.

According to the present invention there is also provided a sixth facsimile apparatus with automatic telephone answering function, comprising: a ring signal detection means for detecting a ring signal repeatedly sent with respect a call from a telephone line; a telephone number detection means responsive to the ring signal for detecting caller identifying telephone number data sent with the ring signal through the telephone line; an interface means for making a connection with the telephone line after the caller identifying telephone number data is sent; a telephone portion including: a hand set means for providing communication with the telephone line for a called party; and an automatic telephone answering means for communicating with the telephone line through the interface means, the automatic telephone answering means having: a message sending means for sending a first message to the telephone line through the interface means; and a message recording means responsive to the message sending means for recording a second message sent from the telephone line through the interface means; a data communication means for communicating with the telephone line with data signals through the interface means; an automatic telephone answering mode setting means responsive to a manual operation for setting a mode signal to an automatic answering mode; a storing means for storing a predetermined telephone number data; a comparing means for comparing caller identifying telephone number data detected by the telephone number detection means with the predetermined telephone number data and for indicating as a result of the comparison whether the telephone portion or the data communication means is to be operated; a first control means for immediately operating the data communication means when the result indicates the data communication means; a counting means for counting a number of detections of the ring signal; a second control means for causing the counting means to count detections of the ring signal and causing the handset means to operate when the result indicates the telephone portion; and a third control means for causing the automatic answering means to operate when the number of detections of the ring signal reaches a predetermined value and the mode signal is set to the automatic answering mode.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described an embodiment of the invention with reference to drawings.

Figure 1:
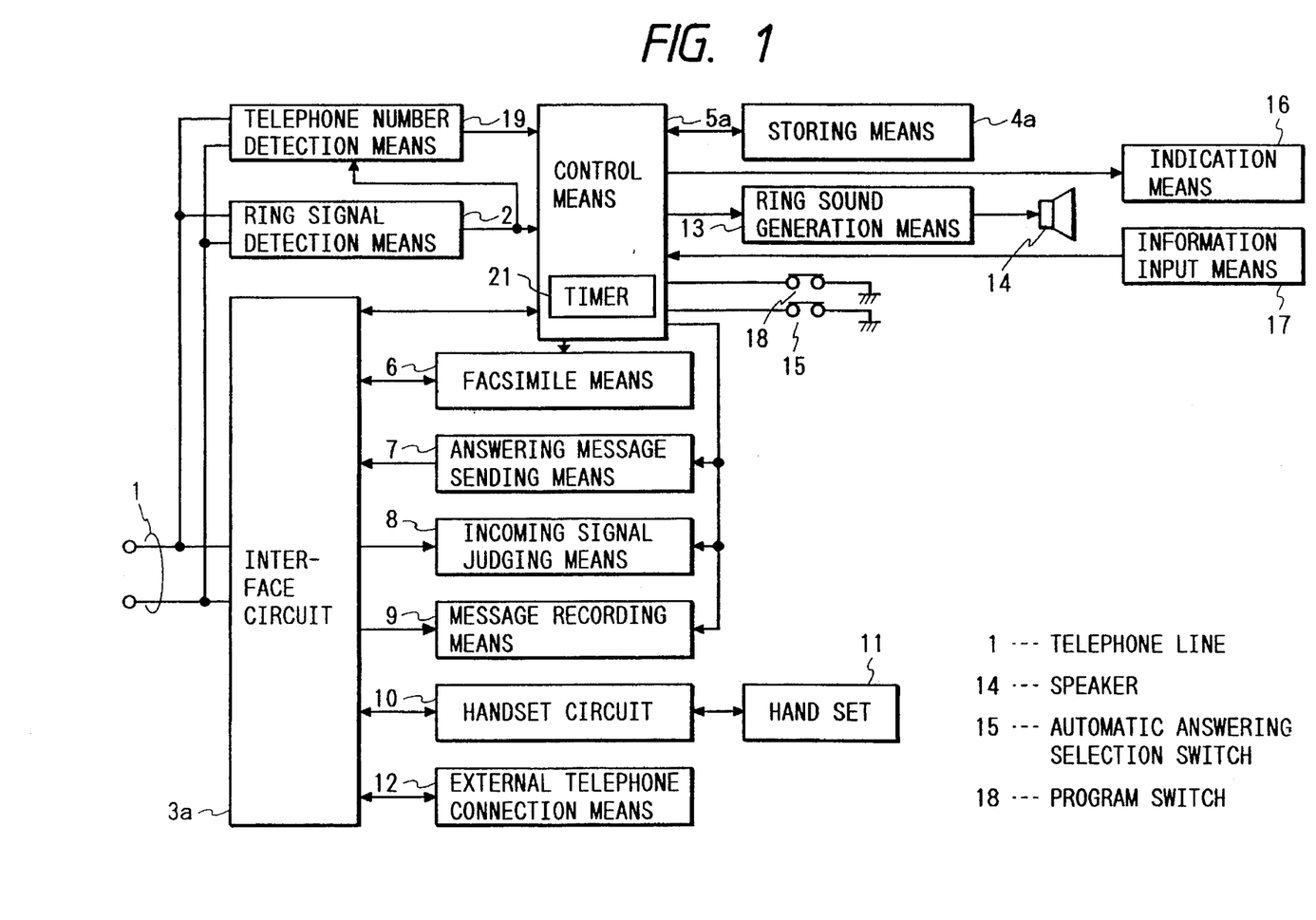
FIG. 1 is a block diagram of an embodiment of the invention of a facsimile apparatus with automatic telephone answering function.
Figure 2:
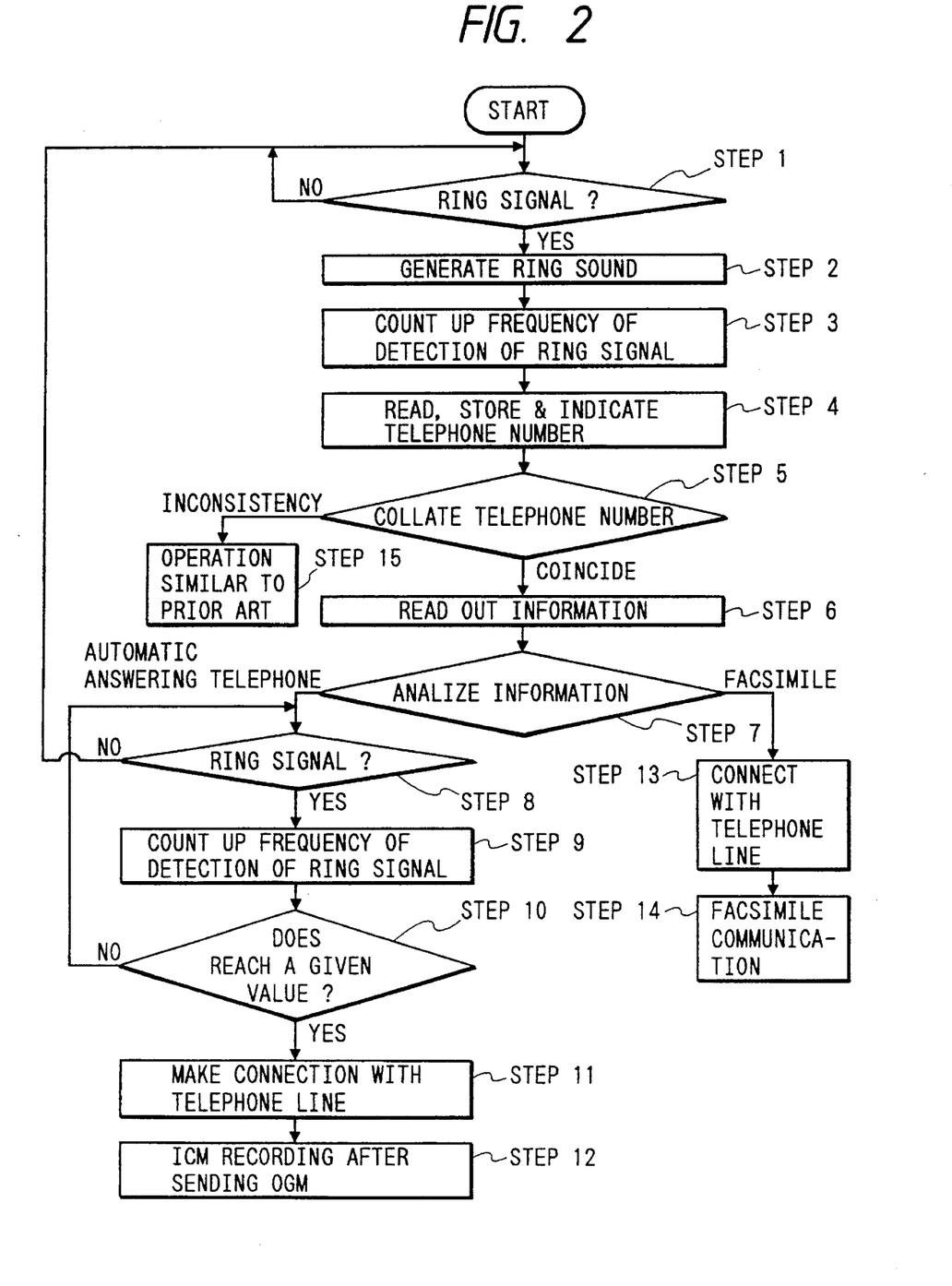
FIG. 2 shows a flow chart showing an operation of automatic answering operation of the embodiment of the invention.

FIG. 1 is a block diagram of the embodiment of the invention of a facsimile apparatus with automatic telephone answering function. FIG. 2 shows a flow chart showing an operation of automatic answering operation of the embodiment of the invention. In FIG. 1, numeral 1 is a telephone line, numeral 2 is a ring signal detection means, numeral 3a is an interface circuit, numeral 4a is a storing means for storing various programs and data such as a ROM and a RAM, numeral 5a is a control means, such as a microprocessor, numeral 6 is a facsimile communication means as data communication means, numeral 7 is an answering message sending means (hereinafter referred to as OGM), numeral 8 is an incoming signal judging means, numeral 9 is a message recording means (hereinafter referred to as ICM) as signal recording means incoming from the telephone line, numeral 10 is a handset circuit, and numeral 11 is a hand set. The handset circuit 10 provides electrical communication passages between the interface circuit 3a and the handset 11. Numeral 12 is external telephone connecting means, numeral 13 is a ring sound generation means, numeral 14 is a speaker, and numeral 15 is an automatic answering selection switch. Numeral 16 is an indication means, numeral 17 is an information input means, numeral 18 is a program switch, and numeral 19 is a telephone number detection means. An automatic answering telephone portion includes the OGM sending means 7 and the ICM recording means 9 and a data communication means comprises the facsimile communication means 6.

The elements having the same functions as those of the prior art are designated by the same or similar references.

Hereinbelow will be described an operation of the facsimile apparatus with automatic telephone answering function mentioned above.

At first, a registration operation of telephone numbers will be described. This apparatus enters a program mode (registration mode) by depressing a program switch 18. A telephone number is inputted through the information input means 17 by an operator. Then, information is inputted by the operator through the information input means 17 in relation to the inputted telephone number to indicate whether the automatic answering telephone portion or the facsimile communication means 6 is operated when there is agreement between a detected caller identifying telephone number and the inputted telephone number. The control means 5a stores the information in the storing means 4a in response to the information input means 17.

After the completion of registration operation, the program switch 18 is depressed again to end the program mode.

Then, the automatic answering operation will be described.

The facsimile apparatus enters the automatic answering mode in response to depression of the automatic answering selection switch 15.

In the automatic answering mode, a ring signal from the telephone line 1 is observed (step 1) using the ring signal detection means 2. When the ring signal detection means 2 detects the ring signal, a ring sound is generated using the ring sound generation means 13 and the speaker 14 (step 2) as similarly to the conventional manner. Moreover, the control means 5a counts up detection of the ring signal (step 3) in response to the ring signal detection means 2.

In response to detection of the first coming ring signal, the telephone number detection means 19 detects a caller's telephone number (caller identifying telephone number) inserted between the first and second coming ring signals from the telephone line 1. Then, the control means 5a reads the detected caller identifying telephone number, stores the detected caller identifying telephone number in the storing means 4a, and indicates the detected caller identifying telephone number by the indication means 16 (step 4). That is, the caller's telephone number data is sent for a silent interval between consecutive ring signals from the exchange. This technique is disclosed in U.S. Pat. Nos. 4,551,581 and 4,582,956. The U.S. Pat. No. 4,551,581 discloses a calling station (switching office) for sending a data message to a selected station during a silent interval between ringing signals. The data message includes the directory number of the calling station.

Then, the control means 5a collates the telephone number of the caller from the telephone line 1 with telephone numbers registered in the storing means 4a (step 5). If there is agreement between the detected caller identification telephone number with one of the registered telephone numbers, that is, the telephone number of the caller has been registered, the control means 5a reads out the information recorded with correspondence to the registered telephone number, which indicates either that the automatic answering telephone portion is to be operated or that the facsimile communication means 6 is to be operated (step 6). In the following step 7, the control means 5a analyzes the read information. If the information indicates that the answering telephone portion is to be operated, the control means 5a confirms that the ring signal detection means detects continuation of the ring signal after this (step 8). If the control means 5a detects continuation of the ring signal, the control means 5a counts up the detection of the ring signal (step 9). Then, the control means 5a judges whether the number of detection of the ring signal reaches predetermined number (step 10). If the number of detection does not reach the predetermined number, processing returns to step 8 to count up the detection of the ring signal. If the number of detection reaches the predetermined number, the control means 5a causes the interface circuit 3a to make a connection with the telephone line 1 (step 11). At the same time, the generation of the ring sound is stopped. Then, the control means 5a causes the OGM sending means 7 to send an OGM to the caller and then, it causes the ICM recording means 9 to operate to record a message sent from the caller after completion of sending the OGM (step 12). If the operation mode is not in the automatic answering telephone mode but is, instead, in the ordinary operation mode, generation of the ring sound is continued until the user sets the system to an OFF-HOOK condition.

In step 7, when the information stored in the storing means 4a indicates that the facsimile communication means is to be operated, the control means 5a immediately causes the interface circuit 3a to make a connection with the telephone line 1 (step 13) and causes the facsimile means to operate (step 14). At the same time, the generation of the ring sound is stopped.

In step 5, if the telephone number inputted from the telephone line 1 does not coincide with any telephone number stored in the storing means 4a, i.e., in the case that the telephone number is not stored in the storing means 4a, or in the case that the telephone number data is not inputted from the telephone line 1, the control means 5a causes the OGM sending means 7 to send the OGM after completion of connection with the telephone line 1, similarly to the prior art operation mentioned earlier. Then, if the incoming signal judging means 8 detects the facsimile demand signal or the facsimile communication start signal or mute over a given interval, it causes the facsimile communication means 6 to operate. If the incoming signal judging means 8 detects a voice signal, it causes the ICM recording means 9 to operate. In other words, the control means 5a makes a decision as to whether the ring signal is present in step 1. In step 1, processing loops until the ring signal is detected. When the ring signal is detected by the ring signal detection means 2 in step 1, processing proceeds to step 2. In step 2, the control means 5a generates the ring sound. In the following step 3, the control means 5a counts up the number of detection of the ring signal. The control means 5a stores the caller's telephone number in step 4 and indicates the caller's telephone number. In the following step 5, the control means 5a collates the telephone number data detected by the telephone number detection means 19 with the registered telephone number stored in the storing means 4a. In step 5, if there is no agreement between the detected telephone number and any of the registered telephone numbers, processing proceeds to step 13 for executing the operation in the conventional manner as shown in FIG. 2. In step 5, if there is agreement between the detected telephone number and one of the registered telephone numbers, processing proceeds to step 6. In step 6, the control means 5a reads out the information recorded with correspondence to one of the registered telephone number which agrees with the detected telephone number. This information indicates either the automatic answering telephone portion is to be operated or the facsimile communication means 6 is to be operated. In the following step 7, the control means analyzes the information to determine which is to be operated the automatic answering telephone portion or facsimile in the automatic answering telephone mode. If the information indicates the automatic answering telephone is to be operated, processing proceeds to step 8. In step 8, the control means 5a detects continuation of the ring signal. If there is no continuation of the ring signal, processing proceeds to the step 1. If there is continuation of the ring signal, processing proceeds to step 9. In step 9, the control means counts up the number of the detection of the ring signal. In the following step 10, the control means makes a decision as to whether the counted number of detection of the ring signal reach a given value. If the answer is No, processing returns to step 8. If the answer is YES, processing proceeds to step 11. In step 11, the control means 5a makes connection with telephone line 1 using the interface circuit 3a. In step 12 the control means causes the OGM sending means 7 to send an OGM to the caller through the interface means 3a and the telephone line 1 and then, the control means 5a causes the ICM recording means 9 to record a message sent from the caller after completion of sending the OGM.

Here, the step 8 is provided for confirming the continuation of the ring signal because there is a possibility that this calling may be stopped before connection is made in step 11. That is, as generally known, the ring signal is repeated at two to three seconds. Therefore, the control means 5a must detect the next ring signal to detects the continuation of the repeating of the ring signal. Therefore, the control means detects the next ring signal in step 8. In other words, processing from step 2 to step 7 is executed during first coming ring signal to the second coming ring signal.

In step 7, if the information indicates that the facsimile is to be operated, processing proceeds to step 13. In step 13, the control means 5a immediately causes the interface circuit 3a to make a connection with the telephone line 1. In the following step 14, the control means 5a causes the facsimile means 6 to operate.

As mentioned above, the control means 5a selectively operates the telephone portion or the facsimile communication means in accordance with the detected telephone number and the registered telephone numbers.

In the above mentioned processing as shown in FIG. 2, in step 5, the control means collates the telephone number detected by the telephone number detection means 19 after detection of the ring signal judged in the step 1. On the other hand, the connection with the telephone line is made in the step 11 or 13 which is later than the step 5 as shown. This means that the caller's telephone number is sent before connection of the telephone line 1. Therefore, the caller's telephone number is not entered by the caller itself.

Figure 4:
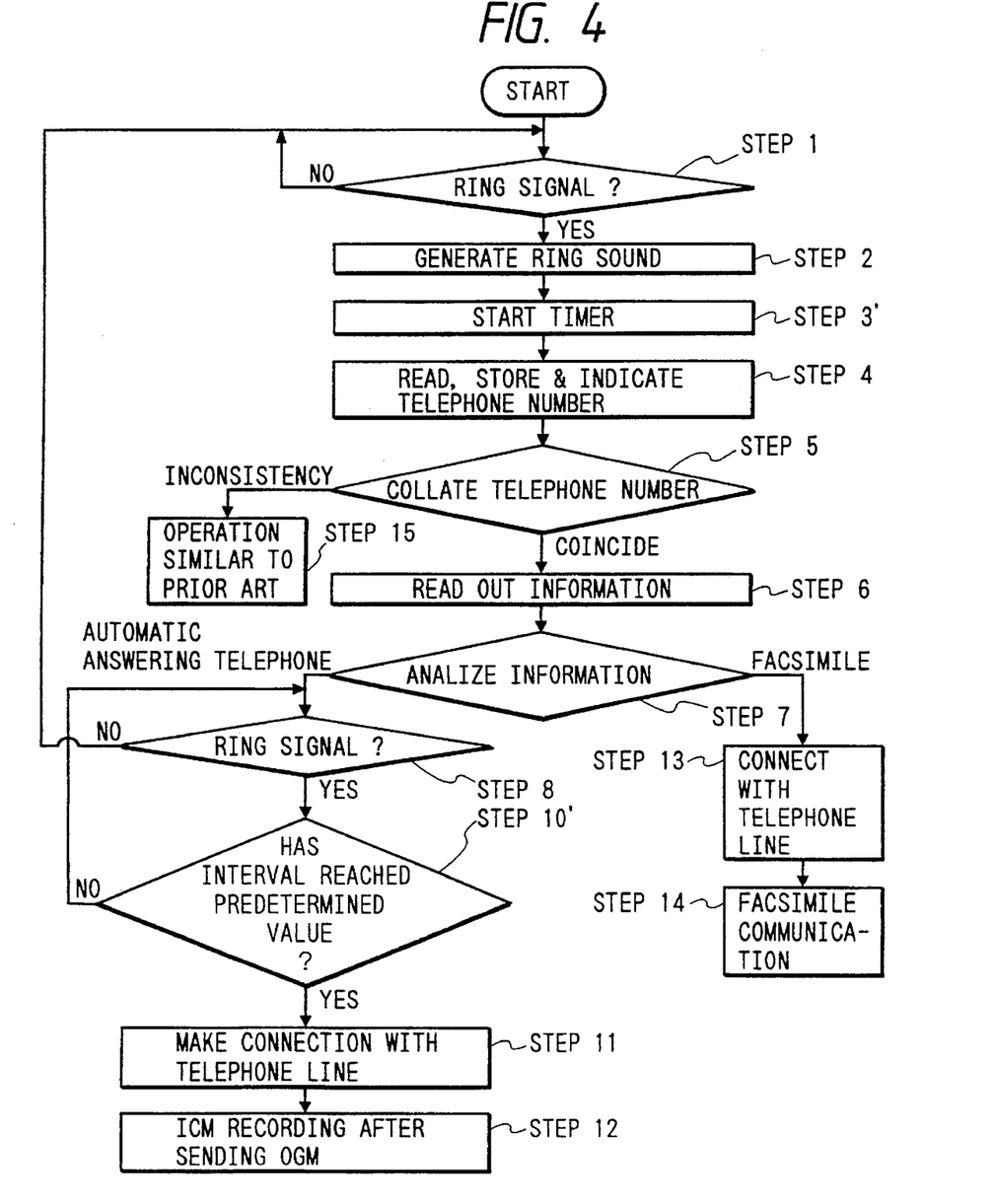
FIG. 4 shows a flow chart of a modification of the embodiment of this invention.

In the above-mentioned operation, because the ring signals are periodically transmitted from the telephone line 1 at a regular interval, the counting steps of steps 3 and 9 and the judging step 10 corresponds to a timer means. Therefore, the sending the OGM and recording the ICM are executed after a predetermined interval. Alternatively, a timer 21 may be provided in the microprocessor 5a, i.e. the control means as shown in FIG. 1. FIG. 4 shows a flow chart of a modification of this embodiment. The control means 5a starts the timer 2 in the step 3' and makes a decision as to whether or not the time interval measured by the timer 21 has reached a predetermined interval in step 10'. If the time interval measured by the timer 21 has not reached the predetermined interval, processing proceeds to step 8. If the time interval measured by the timer 21 has reached the predetermined interval, processing proceeds to step 11. The step 9 is omitted but other operations are the same as FIG. 2.

The application of the invention to data communication by facsimile communication has been described as an example. However, as a matter of course, this invention can similarly deal with other data communication such as personal computer communication which is possible to be used in future by merely changing the contents stored in the memory. The number of kinds of communication is not limited to two but can be three or four.

According to the above-mentioned structure, the control means 5a collates the telephone number data sent from an exchange through the telephone line with the telephone numbers stored in the storing means. If there is agreement, the control means 5a automatically determines whether or not the facsimile means 6 is to be operated as a communication means on the basis of the information stored in relation with the stored telephone number. Therefore, though the apparatus is set to the automatic answering telephone mode, if the caller is a special terminal such as a facsimile, it is possible to start an operation corresponding to a kind of a caller's terminal automatically without operation of sending an answering message. Moreover, it is possible to start operation before connection with the telephone line, so that the response interval can be shortened and to prevent a trouble in the connection operation.

More specifically, if the facsimile means 6 is selected in accordance with the caller identifying telephone number detected by the telephone number detection means with reference to the a pair of the registered telephone numbers and information, the control means makes a connection with the telephone line 1 immediately and if the telephone portion is selected, the automatic telephone answering portion responds after connection with the telephone line 1 with the answering message sending means 7 and the message recording means 9 after the predetermined number of the ring signals or the predetermined interval. Therefore the operator can respond the telephone call during the predetermined interval.

What is claimed is:

1. A facsimile apparatus with automatic telephone answering function, comprising:
   (a) ring signal detection means for detecting a ring signal repeatedly sent with respect a call from a telephone line;
   (b) telephone number detection means responsive to said ring signal detection means for detecting caller identifying telephone number data accompanied by said ring signal from said telephone line;
   (c) interface means for making a connection with said telephone line after said caller identifying telephone number data is detected;
   (d) a telephone portion including:
      hand set means for providing communication with said telephone line for a called party; and
      automatic telephone answering means for communicating with said telephone line through said interface means, said automatic telephone answering means having:
         message sending means for sending a first message to said telephone line through said interface means; and
         message recording means responsive to said message sending means for recording a second message sent from said telephone line through said interface means;
   (e) data communication means for communicating with said telephone line with data signals through said interface means;
   (f) automatic telephone answering mode setting means responsive to a manual operation for setting a mode signal to an automatic answering mode;
   (g) storing means for storing a predetermined telephone number data;
   (h) comparing means for comparing caller identifying telephone number data detected by said telephone number detection means with said predetermined telephone number data and for indicating as a result of the comparison whether said telephone portion or said data communication means is to be operated;
   (i) first control means for immediately operating said data communication means when said result indicates said data communication means;
   (j) counting means for counting a number of detections of said ring signal;
   (k) second control means for causing said counting means to count detections of said ring signal and causing said handset means to operate when said result indicates said telephone portion; and
   (l) third control means for causing said automatic answering means to operate when the number of detections of said ring signal reaches a predetermined value and said mode signal is set to said automatic answering mode.

2. A facsimile apparatus with automatic telephone answering function, comprising:
   ring signal detection means for detecting a ring signal from a telephone line;
   telephone number detection means responsive to said ring signal detection means for detecting caller identifying telephone number data accompanied by said ring signal from said telephone line;
   interface means for making a connection with said telephone line;
   ring sound generation means for generating a ring sound in response to ring signal from said ring signal detection means;
   a telephone portion, having an automatic answering means for providing said automatic answering function, for communicating with said telephone line through said interface means;
   data communication means for communicating with said telephone line through said interface means;
   storing means for storing a predetermined telephone number data;
   comparing means for comparing caller identifying telephone number data detected by said telephone number detection means with said predetermined telephone number data before said interface means makes said connection with said telephone line and for indicating as a result of the comparison whether said telephone portion of said data communication means is to be operated;
   counting means responsive to said ring signal detection means for counting a number of detections of said ring signal; and
   control means responsive to said comparing means and counting means for operating said interface means to make said connection with said telephone line and operating said automatic answering means when the result of said comparing means indicates said telephone portion and the number of detections of said ring signal reaches a predetermined value and for operating said interface means to make said connection with said telephone line and operating said data communication means when the result indicates said data communication means irrespective of the number of detections.

3. A facsimile apparatus as claimed in claim 2, wherein said automatic answering means comprises: message sending means responsive to said control means for sending a first message to said telephone line through said interface means when said telephone portion is operated by said control means; and message recording means responsive to said message sending means for recording a second message sent from said telephone line through said interface means.

4. A facsimile apparatus as claimed in claim 2, wherein said data communication means comprises a facsimile means responsive to said control means for receiving a data signal from said telephone line through said interface means and forming an image from said data signal when said data communication means is operated by said control means.

5. A facsimile apparatus with automatic telephone answering function as claimed in claim 2, wherein said control means responds directly to said comparing means for operating said telephone portion or said data communication means, and in operating said data communication means thereby shortening a response time for data communication by operating free of a requirement for transmission of a data identifying signal and discrimination between data and voice communication.

6. A facsimile apparatus with automatic telephone answering function as claimed in claim 2, further comprising:
   (a) timer means for measuring an time interval in response to said ring signal detection means; and
   (b) second control means for causing said automatic answering means to operate when said result indicates said telephone portion and said interval reaches a predetermined value.

7. A facsimile apparatus as claimed in claim 2, wherein said control means immediately operates said interface means to make said connection with said telephone line and immediately operates said data communication means when the result indicates said data communication means.

8. A facsimile apparatus with automatic telephone answering function, comprising:

ring signal detection means for detecting ring signals from a telephone line, wherein said ring signals occur at regular intervals;

telephone number detection means responsive to said ring signal detection means for detecting caller identifying telephone number data transmitted with at least one of said ring signals;

interface means for making a connection with said telephone line;

a telephone portion, having an automatic answering means for providing said automatic answering function, for communicating with said telephone line through said interface means;

data communication means for communicating with said telephone line through said interface means;

storing means for storing a predetermined telephone number data;

comparing means for comparing caller identifying telephone number data detected by the telephone number detection means with said predetermined telephone number data before said interface means makes said connection with said telephone line and for indicating as a result of the comparison whether said automatic answering means or said data communication means is to be operated;

timer means for measuring a time interval corresponding to a number of said ring signals of regular interval; and control means responsive to said comparing means and said timer means for operating said interface means to connect said telephone line and the automatic answering means when the comparison result indicates the automatic answering means is to be operated and the measured time interval reaches a predetermined value and for operating said interface means to connect said telephone line and said data communication means when the comparison result indicates said data communication means is to be operated.

* * * * *